March 19, 1968 R. A. HARTJE 3,373,697
TRANSPORTATION SYSTEM
Filed March 31, 1966 2 Sheets-Sheet 1
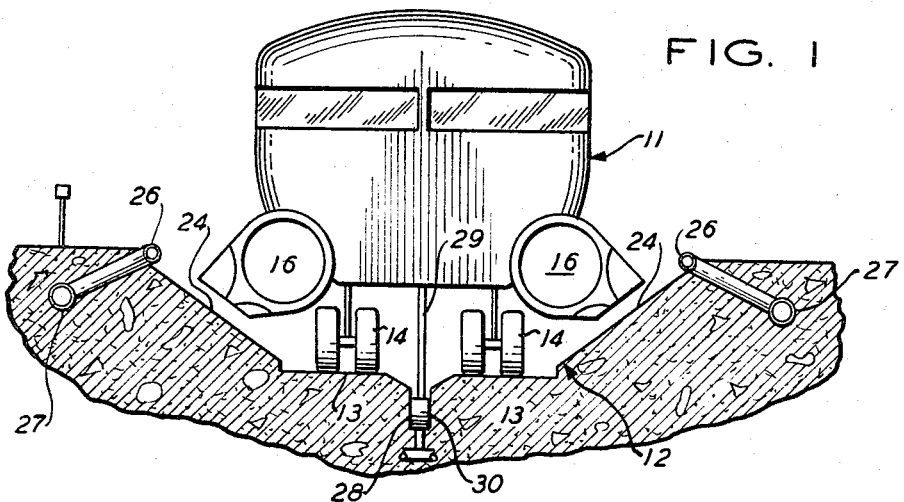
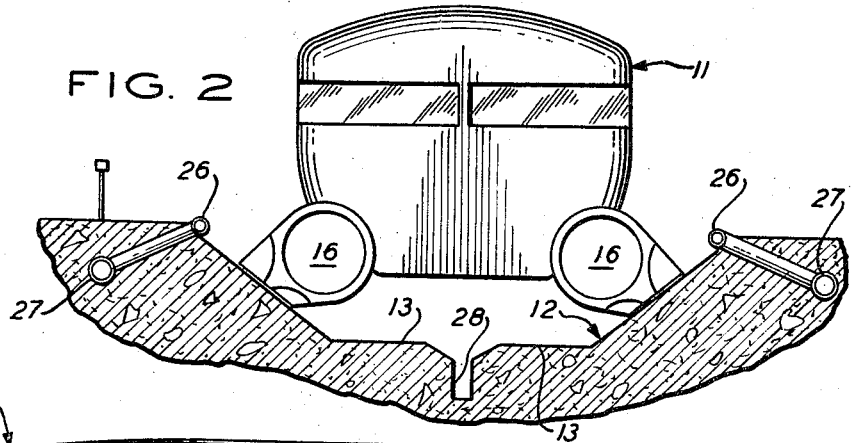
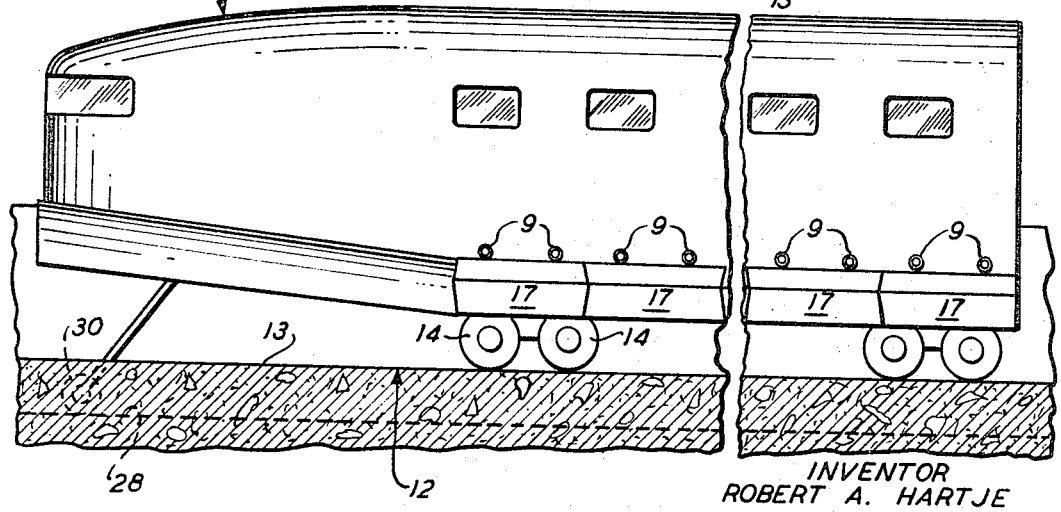
INVENTOR
ROBERT A. HARTJE
BY ATTORNEY March 19, 1968  R. A. HARTJE  3,373,697
TRANSPORTATION SYSTEM
Filed March 31, 1966  2 Sheets-Sheet 2
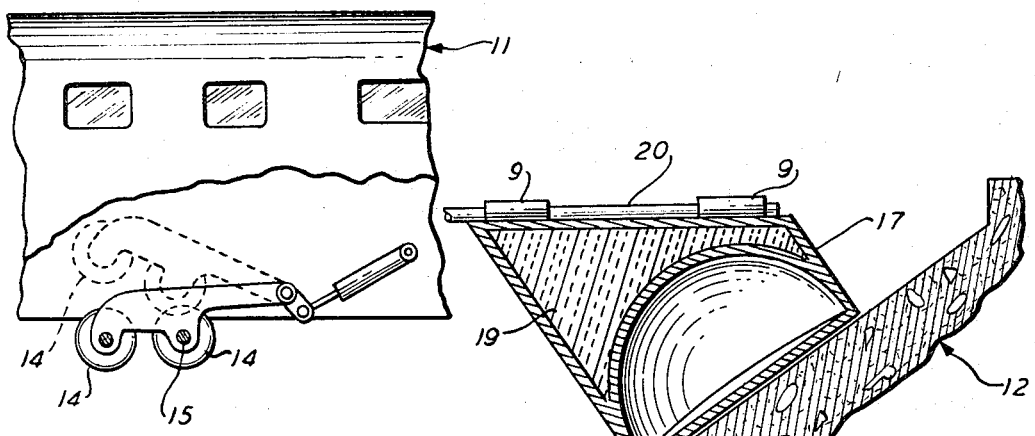
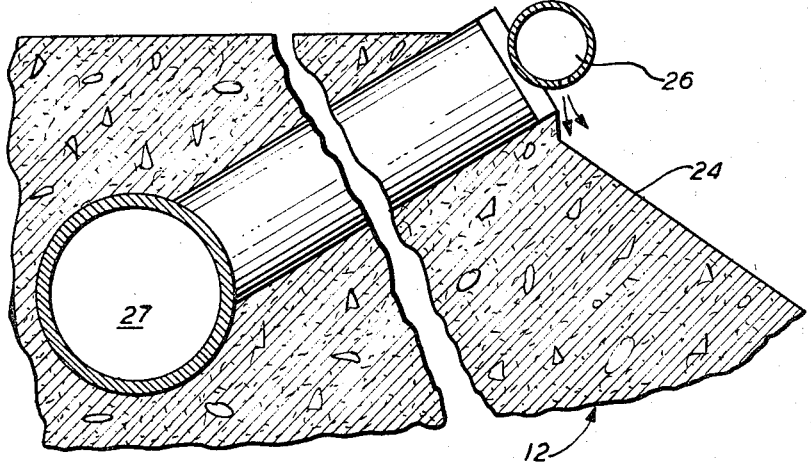
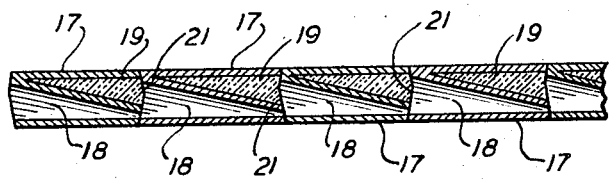
INVENTOR
ROBERT A. HARTJE
BY Norman N. Popper
ATTORNEY

United States Patent Office 3,373,697
Patented Mar. 19, 1968

3,373,697
TRANSPORTATION SYSTEM
Robert A. Hartje, 341 Norwood Ave.,
South Plainfield, N.J. 07080
Filed Mar. 31, 1966, Ser. No. 538,998
6 Claims. (Cl. 104—23)

This invention relates generally to transportation systems, and particularly to a transportation system in which a wheeled-car operates on a track at normal speeds, and at higher speeds, the wheels are withdrawn and the car glides over the track on runners gliding on a cushion of steam.

It is an object of the transportation system to provide high speed operation.

It is yet a further object of the transportation system to provide a car which traverses a track without substantial friction or waste.

It is yet a further object of the invention to provide a transportation system in which a car traverses a track on a cushion of steam.

These objects and advantages, as well as other objects and advantages, may be attained by the transportation system shown by way of illustration in the figures, in which:

FIGURE 1 is a front elevational view showing a car traversing a track on wheels;

FIGURE 2 is a front elevational view of the car with the wheels retracted, traversing the track on runners or shoes, gliding over a cushion of steam;

FIGURE 3 is a side elevational view of the car riding on wheels, with the track partially exploded away;

FIGURE 4 is a partial side elevational view showing the wheel retracting mechanism;

FIGURE 5 is a vertical cross-sectional view of a runner or shoe in approximate engagement with the track;

FIGURE 6 is a vertical sectional view of the track showing the water supply conduits; and FIGURE 7 is a longitudinal sectional view of a plurality of runners or shoes detached from the car.

With the improvement in jet engines, insofar as power output is concerned, such engines become useful in numerous types of transportation systems. High speed operation can be attained by cars gliding on wheels. It is also possible to utilize the jet exhaust to raise the temperature of shoes or runners to such a degree that the contact of such shoes or runners with a road surface, will cause the water on that surface to flash into steam, and provide an exceedingly low friction surface over which the runners or shoes may glide with an intervening cushion of steam. A high speed low friction transportation system is thus achieved.

Referring now to the drawings in detail, there is provided a passenger car 11, which is a generally elongated, tubular body, having suitably disposed passenger seats therein. The car is preferably designed with a generally convex front end, shaped in accordance with well known and recognized aerodynamic principals, in order to minimize air resistance and friction. The car is intended to operate on a trough-like track 12. This track 12 is provided with a flat, wheel-bearing surface 13 upon which wheels 14 mounted on the car 11 will run. The wheels 14 are mounted for retraction in any suitable manner, as for example, is shown in FIGURE 4. When the wheels 14 are in normal position, as shown in FIGURE 1, they ride on the track 12 and support the car 11.

The car 11 is provided with right and left jet engines 16 at the front. The engine 16 discharges the blast through the engine housing into a plurality of shoes 17, arranged on opposite sides of the car 11. The shoes 17 are arranged on both sides of the car at the bottom thereof, the one behind the other. The first shoe, as well as the successive shoe 17 has a generally semi-circular passage therein to receive the jet blast. This passage is conical and tapers to the rear. Each conical passage 18 in each shoe 17 communicates with a similar conical passage 18 in the successive shoe 17.

The shoes are preferably made of metal with a high coefficient of thermal conduction. The conical passages 18 are provided with top sections 19 made of heat insulating material, whereby heat transferred from the top of the shoe 17, is inhibited, and it is the bottom portion of each shoe 17 which is heated.

Each shoe is provided with a top bracket, by which it is rigidly attached to a torsion bar 20. The torsion bars 20 are attached to the car 11. The shoes 17, 17 are provided with end portions 21 which are slanted, so that the shoes may tilt on the flexing torsion bars 20 and adjust themselves with respect to irregularities in the track 12. The temperature of the shoes 17 is maintained at a high point by the exhaust from the jet engine 16, as it passes through the passages 18 from shoe to shoe. When the temperature of the shoes reaches a sufficiently high point, any contact of the shoe 17 with water on the track 12, will cause the water to flash into steam, and the shoes will accordingly glide over the cushion of steam. Thus, the wheels 14 may be retracted, permitting the shoe 17 to engage the track 12. The track 12 has side portions 24, which are generally flat, and extend from the wheel-bearing surface 13 in an upward and outward direction at an angle of approximately 45° from horizontal. The retraction of the wheels 14 lowers the car 11 until the shoes 17 are in approximate engagement with the shoe bearing surfaces 24. Inside of the track 12, there is a water supply conduit 27, communicating with a pipe 26, which runs the length of the track and is positioned at the top of the shoe bearing surface 24. Water discharged from this pipe, flows over the shoe bearing surface 24.

The track 12 is also provided with a guide slot 28. The car 11 has a guide 29. A wheel 30 mounted on the end of the guide 29 rides in the slot 28, and maintains the car 11 in proper position, centered in the track 12.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. A transportation system comprising:
 (a) a track;
 (b) a generally horizontal wheel-bearing surface on the track;
 (c) a guide-slot in the track;
 (d) a pair of shoe-bearing surfaces on the track extending upwardly and outwardly from opposite edges of the wheel-bearing surfaces;
 (e) a vehicle;
 (f) retractable wheels on the vehicle engageable and disengageable with the wheel-bearing surface of the track;
 (g) a guide on the vehicle extending into the slot;
 (h) a plurality of shoes attached to the vehicle at opposite sides thereof and positioned for engagement with the shoe-bearing surfaces when the wheels are retracted from the wheel-bearing surfaces;
 (i) passages in the shoes communicating with each successive shoe;
 (j) means for raising the temperature of the shoes at the point of engagement with the shoe-bearing surfaces sufficiently high to turn water on those surfaces to steam;

(k) means to supply water to the shoe-bearing surfaces.

2. A transportation system comprising:
(a) the system according to claim 1, and
(b) the guide-slot positioned in the track in the center of the wheel-bearing surfaces;
(c) the guide on the vehicle extending downwardly at the bottom center of the vehicle.

3. A transportation system comprising:
(a) the system according to claim 1, and
(b) a wheel at the bottom end of the guide in rolling contact with the bottom of the slot.

4. A transportation system comprising:
(a) the system according to claim 1, and
(b) the means for raising the temperature of the shoes being a jet-type engine disposed to discharge its blast into the passages in the first shoes, and thence to the passages in the successive shoes.

5. A transportation system comprising:
(a) the system according to claim 1, and
(b) the vehicle riding on a cushion of steam generated between the shoes and the shoe bearing track.

6. A transportation system comprising:
(a) the system according to claim 1, and
(b) each of the shoes yieldably mounted to conform to curved sections of the shoe-bearing track, and to conform to the positions of adjacent shoes.

References Cited

UNITED STATES PATENTS 615,475  12/1898  Carlson _____ 104—156

FOREIGN PATENTS 111,698  5/1962  Pakistan.

ARTHUR L. LA POINT, *Primary Examiner.*

R. M. WOHLFARTH, *Assistant Examiner.*